Figure 1:
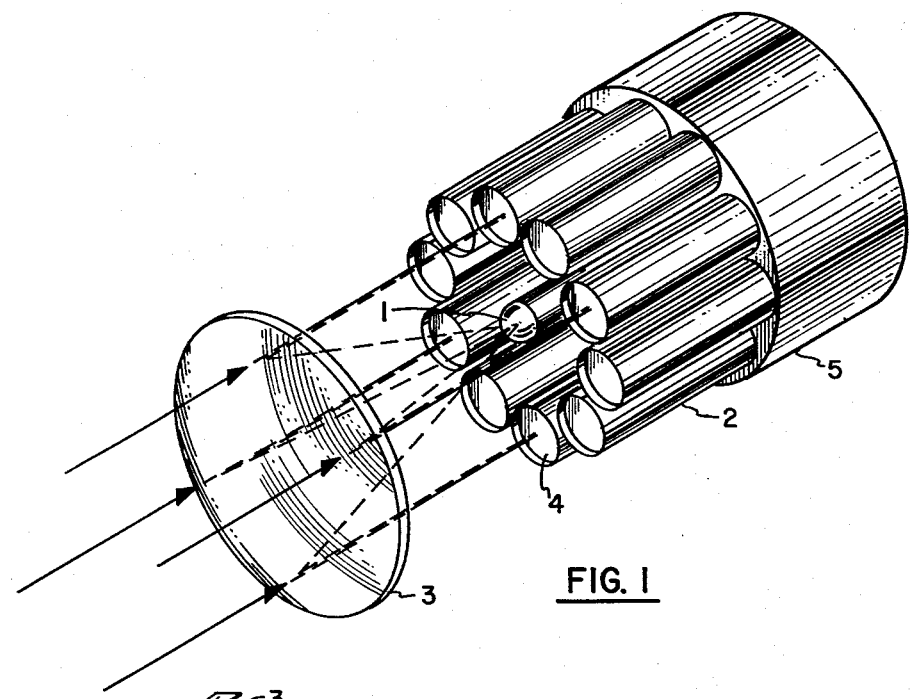

Dec. 24, 1963   T. F. McHENRY   3,115,030
CALIBRATION SYSTEM
Filed Dec. 4, 1961

INVENTOR.
THOMAS F. MCHENRY
BY
ATTORNEY 3,115,030
CALIBRATION SYSTEM
Thomas F. McHenry, Norwalk, Conn., assignor to Barnes
 Engineering Company, Stamford, Conn., a corporation
 of Delaware
Filed Dec. 4, 1961, Ser. No. 156,816
5 Claims. (Cl. 73—1)

This invention relates to a calibrating system and in a more specific aspect to a calibrating system for the simultaneous calibration of a plurality of radiation sensing instruments.

In a great many instruments involving radiation sensors calibration, either continuous or periodic, is desirable. In instruments having only a single radiation sensor it is often possible to incorporate continuous calibration by way of a reference source, for example in infrared sensors a black body maintained at predetermined temperatures. However, the problem becomes much more serious with instruments having multiple radiation sensors such as radiometers with multiple detectors or where a number of radiation sensing instruments operate through a single window. A typical instance is presented by airborne radiation equipment which usually makes radiation observations through a window often in the form of a dome.

The problem may arise in the case of a single instrument with multiple detectors as, for example, a radiometer with a number of radiation detectors sensitive to different radiation bands or there may be several instruments which make radiation measurements through the same window or dome. In this latter case the instruments may be located at different distances from the window and it is one of the advantages of the present invention that calibration simultaneously of a number of instruments can be effected regardless of their distance from the window. The airborne instruments present always a problem of weight and it is a further advantage of the present invention that the instruments can be calibrated in a system which is far lighter than would be the case if each instrument, or each radiation detector in a multiple detector instrument, had its own calibrating source.

The above reference to airborne instruments points up a field in which the saving in components and weight which is possible by the present invention is of particular value. However, it should be understood that the invention is not limited in the slightest in the nature and place of use of the instruments which are calibrated thereby. It is also true that one of the most important single fields in which the present invention is applicable is in the calibration of instruments having detectors operating on infrared radiations or including some such detectors. On the other hand the invention is actually an invention in optics and the nature of the radiation or radiations involved has nothing to do with the invention except of course insofar as it may set certain limits on the nature of window material used.

The present invention solves the simultaneous calibration problem by utilizing a characteristic which is ordinarily unwanted and eliminated as far as possible. This characteristic is window reflection. Ordinarily reflection on either face of a radiation transmitting window is undesirable and a great effort is made to reduce or eliminate it with antireflection coatings and the like. It cannot be eliminated entirely and the present invention makes practical and important use of this residual reflection.

Essentially the present invention employs as a window for the radiation sensing instrument or instruments a dome shaped structure. This type of structure is quite commonly used on aircraft but the present invention associates other elements in a particular combination therewith to produce multiple calibration. Let us assume a number of radiation instruments looking out through the same dome shaped window. The radiation sensitive elements of the instruments may be at different distances from the window, or in the case of a multiple detector instrument, they may be at a single distance. The present invention provides a calibrating radiation source such as a glow tube or other source the radiation of which can be accurately fixed located at the focus of the dome shaped window. Radiation from the calibrating source therefore is reflected back in the form of a collimated light. The residual reflection of the dome may be very small, for example it may be as small as two or three percent, but since the calibrating source is near and can be fairly intense an adequate calibrating radiation level is readily obtained even with a dome having extremely low reflectance on its inner or concave side.

Since the light from the calibrating source is reflected as a collimated beam it makes no difference at what distance from the dome the various instruments are located or more properly their radiation detectors. It is thus possible to utilize the present invention for the simultaneous calibration of a number of instruments looking out through a single dome which instruments may have either single or multiple detectors.

An important advantage of the present invention lies in the fact that it utilizes a dome shaped window which is already necessary for sheltering the instruments and permitting the desired radiation to reach them. The same element is caused to perform a dual function by designing it in a dome shape with its concave side in. This effects a further saving in weight and in complexity which is, of course, of particular value when weight must be kept at a minimum. Even were this not a factor the dual use of a single stationary element reduces the number of elements needed and increases thereby the reliability.

The present invention is particularly adapted to such precision instruments and when used with such instruments a very simple form provides for continuous calibration although continuous calibration is not essential to the present invention in its broadest aspects. Assuming, for example, that the radiation sensing instruments all put out A.C. signals of the same or different frequencies the calibrating source may be actuated at a different frequency, either higher or lower, and simple conventional electronic circuits can separate signals produced by the calibrating radiation from those produced by the radiation for which the instrument is particularly designed. Once the different frequency signals have been separated they can be compared with the signals which the instruments are receiving and so continuous calibration for a number of instruments or for a plurality of detectors in a single instrument or both can be effected.

The frequency of the calibrating radiation may be produced in various ways. One of the best ways is to actuate the reference source by an alternating current of the desired frequency. This can easily be effected with many source such as glow tubes. Where the source does not lend itself readily to pulsation at a particularly alternating frequency, for example when the time constant of the source is not too great, the calibrating radiation can be chopped with a conventional chopper. As far as the instruments being calibrated are concerned it is a matter of complete indifference how the pulsating calibrating radiation was produced. However, when mechanical chopping means are used the additional complication and, where of importance, weight must be accepted. Therefore, for a great many uses, for example airborne uses, electrical pulsation of the calibrating radiation is preferable.

The preferred modification of the present invention where calibration is continuous is not the only method of using the present invention. For example, for certain purposes it is not necessary to provide for continuous calibration. Occasional calibration is entirely adequate. Sometimes the warning feature thaat assures that the instrument is operating properly is of more importances than calibrating. For example, if the instruments in an aircraft are carefully calibrated on the ground before it starts it may be sufficient to turn on the calibrator of the present invention for only a short time when the plane has reached the place where radiation measurements or detections are to be made and this will assure that the instruments are still calibrated and particularly that they are functioning, something which can be a matter of vital importance. It is possible to use the present invention for an occasional or intermittent calibration or warning. The extreme light weight and multiple use of elements already needed makes such a safety factor readily adaptable to many uses.

The invention will be described in greater detail in conjuction with a multiple detector infrared radiometer.

Figure 2:
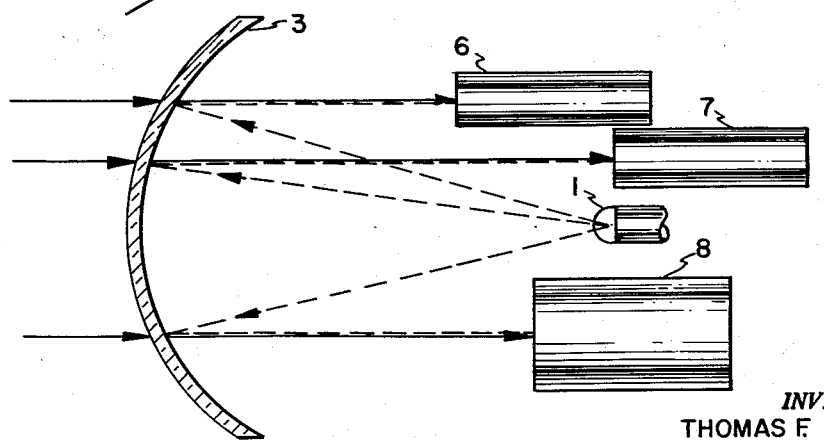

The drawings show:

FIG. 1 as an isometric view showing only the essential elements of the present invention, and FIG. 2 is a side elevation, partly in section showing three instruments at different distances from the dome.

A calibrating source 1, illustrated as a glow tube, is centrally located in a cluster of ten infrared detectors 2. Each detector is housed in a cylinder as shown and is provided with a germanium lens 4 focusing incoming parallel radiation on the infrared detectors, (not shown). The detectors are of conventional design and are in no wise affected by the present invention. Light, or rather radiation, for the instrument enters a dome shaped window 3 which is convex on the outside and concave on the inside. The location of the dome with respect to the calibrating source 1 and the curvature of the dome are so chosen that radiation from the calibrating source is collimated after reflection. The dome is treated for minimum reflection and only about three to four percent of the radiation from the calibration lamp is reflected. However, the lamp is a strong source and a level of calibrating radiation is produced which is entirely satisfactory.

The output signals from the detectors are amplified in individual preamplifiers in a housing 5. The amplified outputs are then led to conventional processing circuits which compare the calibrating signals and provide the necessary output for measurement and the like. As the present invention does not significantly change the nature of these standard circuits they are not shown nor is the conventional cable connecting the preamplifiers 5 therewith.

The drawing illustrates a single multiple detector instrument and a very small dome shaped window. Often in an airborne installation there will be a number of instruments and a much larger dome. Regardless of whether the instruments are all located at the same distance from the dome the same calibration is obtained because the calibrated radiation is collimated.

FIG. 2 illustrates an arrangement with three instruments, 6, 7 and 8, located at different distances from the dome 3. As the position of the calibrating light 1 is at the focus of the curved dome, light is collimated and so it is immaterial that the three instruments are at different distances from the dome.

If considerations of power consumption or other factors make it desirable the calibration source need not operate continuously. It may be turned on intermittently for short periods of time either by manual control, by preprogrammed control or in the case of an unmanned vehicle by radio command.

I claim:
1. A calibration system comprising in combination and in optical alignment.
    (a) a dome shaped window convex on the outside and concave on the inside and having a low specular reflection surface on the inside,
    (b) at least one instrument having at least one radiation detector positioned on the concave side of the window to receive radiation therethrough, and
    (c) a calibration radiation source located at the focus of the inner surface of the window.
2. A system according to claim 1 in which there are a plurality of radiation detectors and calibration for all is simultaneous.
3. A system according to claim 1 in which means are provided for producing from the calibrated radiation source pulsating radiation at a predetermined frequency.
4. A system according to claim 3 in which the calibration source is a radiation of short time constant and it is actuated by alternating current at the predetermined frequency.
5. A system accordingly to claim 3 in which the means are provided in the radiation sensing instruments for producing alternating outputs from the radiation detectors and the frequencies of these outputs are different from the frequency of the pulsing calibrating radiation and an electronic circuit in the output of the detectors for producing comparison with the output at calibration frequency.

References Cited in the file of this patent
UNITED STATES PATENTS
2,947,876    Larew _____ Aug. 2, 1960